(12) United States Patent
Garg et al.

(10) Patent No.: US 7,457,357 B2
(45) Date of Patent: Nov. 25, 2008

(54) DECISION FEEDBACK EQUALIZER DESIGN WITH INTERFERENCE REMOVAL AND REDUCED ERROR PROPAGATION

(75) Inventors: Rahul Garg, Haryana (IN); Shobha Ramaswamy, Karnataka (IN); Aparna Chahrakodi Krishnashastry, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 595 days.

(21) Appl. No.: 11/121,455

(22) Filed: May 4, 2005

(65) Prior Publication Data

US 2005/0254571 A1 Nov. 17, 2005

Related U.S. Application Data

(60) Provisional application No. 60/570,707, filed on May 13, 2004.

(51) Int. Cl.
*H03H 7/30* (2006.01)
*H03H 7/40* (2006.01)

(52) U.S. Cl. .............. 375/233; 375/229; 375/230; 375/231; 375/232

(58) Field of Classification Search ......... 375/229–236, 375/316
See application file for complete search history.

(56) References Cited

U.S. PATENT DOCUMENTS

| | | | |
|---|---|---|---|
| 6,678,310 B1 * | 1/2004 | Andren et al. | 375/147 |
| 6,690,715 B2 * | 2/2004 | Webster et al. | 375/148 |
| 6,754,294 B1 * | 6/2004 | Adireddy et al. | 375/348 |
| 7,116,734 B1 * | 10/2006 | Nergis | 375/346 |
| 7,263,119 B1 * | 8/2007 | Hsu et al. | 375/150 |
| 7,289,559 B2 * | 10/2007 | Chen et al. | 375/233 |
| 7,324,590 B2 * | 1/2008 | Abrishamkar et al. | 375/233 |
| 2001/0036223 A1 * | 11/2001 | Webster et al. | 375/152 |
| 2003/0095593 A1 * | 5/2003 | Tripathi et al. | 375/233 |
| 2003/0161421 A1 * | 8/2003 | Schmidt et al. | 375/346 |
| 2004/0101068 A1 * | 5/2004 | Wang et al. | 375/324 |
| 2004/0125884 A1 * | 7/2004 | Wei et al. | 375/265 |
| 2004/0146129 A1 * | 7/2004 | Lin | 375/348 |
| 2004/0240538 A1 * | 12/2004 | Abrishamkar et al. | 375/233 |
| 2004/0264552 A1 * | 12/2004 | Smee et al. | 375/147 |
| 2005/0018765 A1 * | 1/2005 | Endres et al. | 375/223 |
| 2005/0063498 A1 * | 3/2005 | Chen et al. | 375/348 |
| 2005/0094715 A1 * | 5/2005 | Hwang et al. | 375/148 |
| 2005/0249269 A1 * | 11/2005 | Tomasin et al. | 375/148 |
| 2005/0254571 A1 * | 11/2005 | Garg et al. | 375/233 |
| 2005/0254572 A1 * | 11/2005 | Garg et al. | 375/233 |
| 2007/0165707 A1 * | 7/2007 | Margetts et al. | 375/150 |

* cited by examiner

*Primary Examiner*—Chieh M. Fan
*Assistant Examiner*—Jason M. Perilla
(74) *Attorney, Agent, or Firm*—Global IP Services, PLLC; Prakash Nama

(57) ABSTRACT

A method for designing a decision feedback equalizer (DFE) that handles packet based input data signals uses an inter symbol interference (ISI) removal loop and an inter chip interference (ICI) removal loop which is nested inside the ISI loop, for maximum interference removal and limited error propagation. The DFE may use a feed forward filter and a series connected chip-flow control buffer for receiving the input data signals. The DFE of the invention has application in 802.11 b PHY and 802.11 g PHY scenarios and any application involving a DFE with the need for minimum error propagation. Taught herein is a combined weighted DFE with erasure provision and interference removal in an optional two step mechanism. An article comprising a computer storage medium to execute the DFE design method is also disclosed.

24 Claims, 2 Drawing Sheets

US 7,457,357 B2

DECISION FEEDBACK EQUALIZER DESIGN WITH INTERFERENCE REMOVAL AND REDUCED ERROR PROPAGATION

RELATED APPLICATIONS

Benefit is claimed under 35 U.S.C. 119(e) to U.S. Provisional Application Ser. No. 60/570,707, entitled "Maximum Interference Removal DFE, with minimum error propagation Weighted ICI Feedback Loop embedded inside the ISI Loop DFE Design with Limited error Propagation", by Rahul Garg et al., filed May 13, 2004, which is herein incorporated in its entirety by reference for all purposes.

FIELD OF THE INVENTION

The invention generally relates to decision feedback equalizer (DFE) design, and more particularly to DFE design for implementation in wireless local area networks.

BACKGROUND OF THE INVENTION

DFE is a feedback based scheme for channel equalization in signal handling. For signal processing, the text of the high speed extension of the IEEE standard 802.11 specifies complementary code keying (CCK) as the modulation scheme for 5.5 and 11 Mbps data rates in the 2.4 GHz band. In the CCK modulation scheme, CCK code words are transmitted which correspond to the actual bits to be sent. The IEEE 802.11 CCK codes are polyphase complementary codes (or binary complementary sequences or number of pairs of like elements) with any given separation in one series being equal to the numbers of pairs of unlike elements with the same separation in the other series. The 802.11 complementary spreading codes in one form have a code length of 8 and a chipping rate of 11 M chips/s. The 8 complex chips comprise a single code word. Each CCK code word consists of eight chips. In the 5.5 Mbps case, incoming bits are divided into blocks of four bits. The MSB two bits are used to select one of the four code words and LSB two bits to perform DQPSK modulation on all the eight chips of the selected code word. Similarly, in 11 Mbps case, incoming bits are divided into blocks of eight bits, MSB six bits are used to select one of the 64 code words and LSB two bits to perform DQPSK modulation. So, each code word is called a 'symbol' and the eight values in each code word are called 'chips'.

Transmitted signal can thus be represented as, $s1 = [c1, c2, c3, c4, c5, c6, c7, c8]$
$s2 = [c1, c2, c3, c4, c5, c6, c7, c8]$
...
...
$sn = [c1, c2, c3, c4, c5, c6, c7, c8]$,
where $s1, s2 \ldots sn$ are the symbols and
$c1, c2 \ldots c8$ are the chips The symbols $s1, s2 \ldots sn$ are transmitted sequentially.

Now, in the receiver, the symbol decision, which is deciding all the eight chips of the symbol, is performed using CCK demodulation. This involves correlation with each of four code words and maximum picking in the 5.5 Mbps case and correlation with each of 64 code words and maximum picking for the 11 Mbps case. This will be used to remove inter symbol interference. But, to remove the interference caused due to the chips within a symbol, chip decision is used. Symbol decision consists in deciding $s1, s2 \ldots sn$ and chip decision consists in deciding $c1, c2 \ldots c8$ for each symbol.

A base band processor implements the CCK waveform to achieve high data rates over wireless links. The base band processor can generally improve packet error rate performance in multi-path environments through the use of rake receiver architecture and decision feedback equalizer. However, the question of interference removal and reducing error propagation in DFE designs needs to be addressed to obtain efficient performance.

SUMMARY OF THE INVENTION

One embodiment of the invention resides in a method of designing a decision feedback equalizer (DFE) for packet based signal handling, wherein complementary code keying (CCK) is used and is associated with CCK symbols, the method comprising the steps of: providing an inter chip interference (ICI) loop for addressing removal of ICI caused on next chips, using chip decisions; providing an inter symbol interference (ISI) loop for addressing removal of ISI caused on symbols, using symbol decisions; and, placing said ICI loop to be nested within said ISI loop. A second embodiment teaches a decision feedback equalizer (DFE) for use in packet based signal handling for wireless local area network (WLAN) implementation, where complementary code keying (CCK) is used in association with CCK symbols, said DFE comprising: an inter chip interference (ICI) loop for addressing removal of ICI caused on next chips, using chip decisions; an inter symbol interference (ISI) loop for addressing removal of ISI caused on symbols using symbol decisions, said ICI loop being disposed within said ISI loop. Also taught herein is an article comprising a storage medium having instructions thereon which when executed by a computing platform, result in the method of designing a DFE as stated above. The invention is applicable in DFE designs for reducing error propagation and increasing interference removal. At least two examples of the application of the invention are 802.11 b PHY and 802.11g PHY. The physical layer (PHY) covers the physical interface between devices and is concerned with transmitting raw bits over the communication channel. IEEE 802.11b physical layer is an extension to IEEE 802.11 physical layer which supports 1 and 2 Mbps. IEEE 802.11b can support higher data rates of 5.5 and 11 Mbps by using Complementary Code Keying (CCK) with Differential Quadrature Phase Shift Keying (DQPSK) modulation.

Other applications of the DFE design as explained herein are also conceivable and are envisaged to be within the ambit of the invention.

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is not to be taken in a limiting sense, and the scope of the present invention is defined only by the appended claims.

Figure 1:
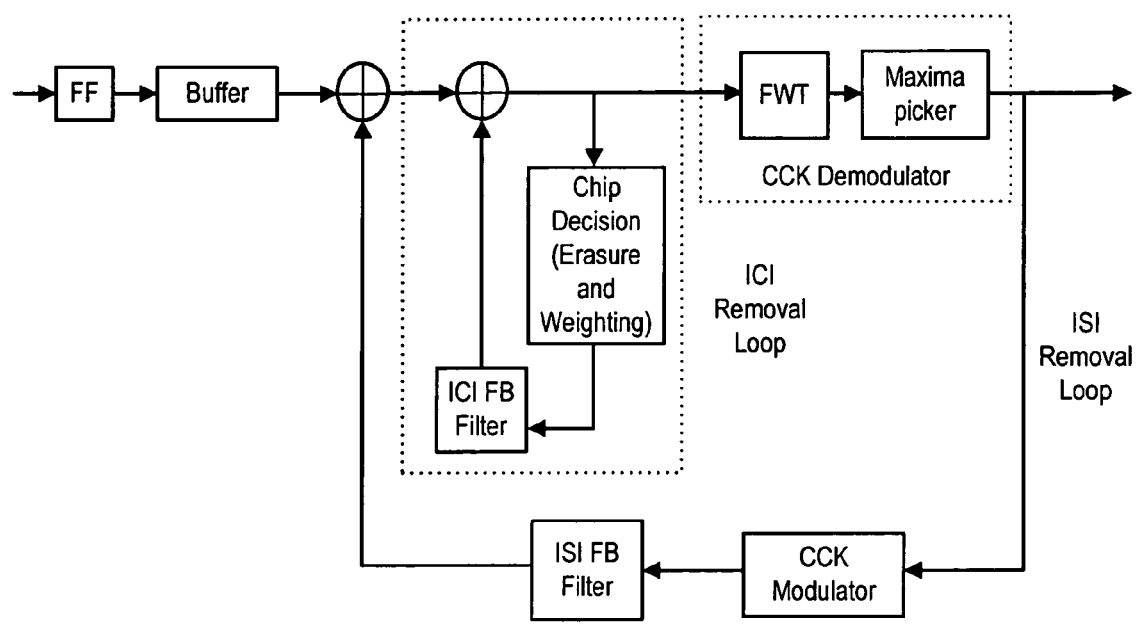
FIG. 1 illustrates an exemplary block diagram showing DFE arrangement incorporating the invention.

FIG. 1 illustrates a block diagram of a DFE which embodies the present invention. Incoming signals which may be packet based, are processed in the feed forward filter FF and passed through input buffer labelled "Buffer", for controlling inflow of chips. The buffer may have architecture as described in the co-pending U.S. application which is filed on the same date as the present application and is based on U.S. Provisional Application 60/570,712. The signal passing through the buffer gets subjected to ISI removal in the loop labelled "ISI removal loop", and to ICI removal in the loop labelled "ICI removal loop". The ISI removal loop includes a CCK modulator and a feedback filter for ISI removal. The ICI removal loop includes a chip decision block where decisions are multiplied by a certain weight factor and fed to the feedback filter. As illustrated, the DFE also includes a CCK demodulator which includes a Fast Walsh Transform (FWT) and a Maxima picker, the output of which in turn is connected to a DPSK demodulator. FWT is used for CCK demodulation, which involves correlation with the known code words and picking the code word with the maximum correlation as the transmitted code word. In the case of 5.5 Mbps, it is correlation with four code words. But, in the 11 Mbps case, the correlation needs to be with 64 code words. Since, 64 correlations are computation intensive, FWT is a way of performing such correlations in a faster way.

Block codes like CCK (Complementary Code keying) are used in WLAN standards like 802.11b to obtain higher data rates for transmission. CCK codes perform well for small indoor multipath channels when used with a RAKE receiver. To obtain high performance of these codes in the presence of long multipath channels requires the presence of high performance equalizer. The design is analyzed for the decision feedback equalizer (DFE), with the assumption of an ideal feed forward filter.

Each CCK symbol is compose of 8 chips. The interference left after the received signal is passed through the feed forward filter can be split into Inter Symbol Interference (ISI) due to the neighboring codeword and Inter Chip Interference (ICI) due to the chips within the symbol.

To obtain an efficient feed back loop design, in the described example, the present method is implemented by obtaining the change in the distance properties of the CCK code words in the presence of the ISI and ICI separately, leading to degradation in the demodulator performance. Thereafter the feedback loops are designed to remove the interference due to ISI and ICI. The loops are designed to perform based on two considerations: Maximum interference removal and Minimum error propagation. Maximum interference removal requires that whenever the decisions of the chips and the code words are correct, the interference due to these on next chips (ICI)/code words (ISI) should be removed. On the other hand, minimum error propagation requires that whenever the decision goes wrong, the feedback loop does not remove the interference. To address both of these requirements a trade-off in the design is made based on the probability of decision errors and the interference removal requirements for operation under long multipath channels.

Since the 802.11b systems are packet-based systems, the error in the decision of any symbol leads to the packet loss and symbol error rate, and can be used as a measure of packet error rate. Also, it is noted that the performance of the symbol decisions of the ISI loop alone, is good for long channels, while the decisions of the chips in the ICI loop may be prone to errors. It is noted therefore that the error-dynamics of the ICI loop govern the design of the equalizer. Further, since the symbol decisions can be assumed to be correct for no-packet error, a design based on embedding the ICI loop inside the ISI loop is chosen with consequent benefits.

The decision error probability in the ICI loop may be analyzed based on the Euclidean distance. The error analysis may be done using a controlled simulation environment. This error probability is used to optimize the performance of the feedback loop based on the considerations explained.

The following features are noted:
1. Taught herein is the use of a two-step mechanism for post cursor interference removal using a feedback loop. This 2-step mechanism is based on
    Removing the decisions prone to high errors (1st step)—{Erasure}
    Scaling the other decisions based on the error probability (2nd step)—{Weighting}

The weighting function and/or erasure threshold can be performed based on techniques, like Euclidean distance, minimum distance on I and/or Q paths, average distance from the ideal constellation on I and Q paths.

2. In another embodiment, the 2-step mechanism for interference removal is embedded inside the ISI Loop (which can be running based on the assumption of correct decisions and/or weighted decisions).
3. In another embodiment, one of the 2-steps detailed in 1, can be performed.
4. In another embodiment, the weighting function is kept as a constant.
5. In another embodiment, the threshold for the weighting and erasure may be computed based on the input signal properties.

The foregoing description of the design approach for a DFE provides a combined weighted DFE with the erasures, and a low delay feedback loop for the implementation. The invention is applicable in any scenario that involves a DFE with the need for reduced error propagation, and may be implemented in 802.11 b PHY and 802.11 g PHY and other situations as well, without limitation.

Figure 2:
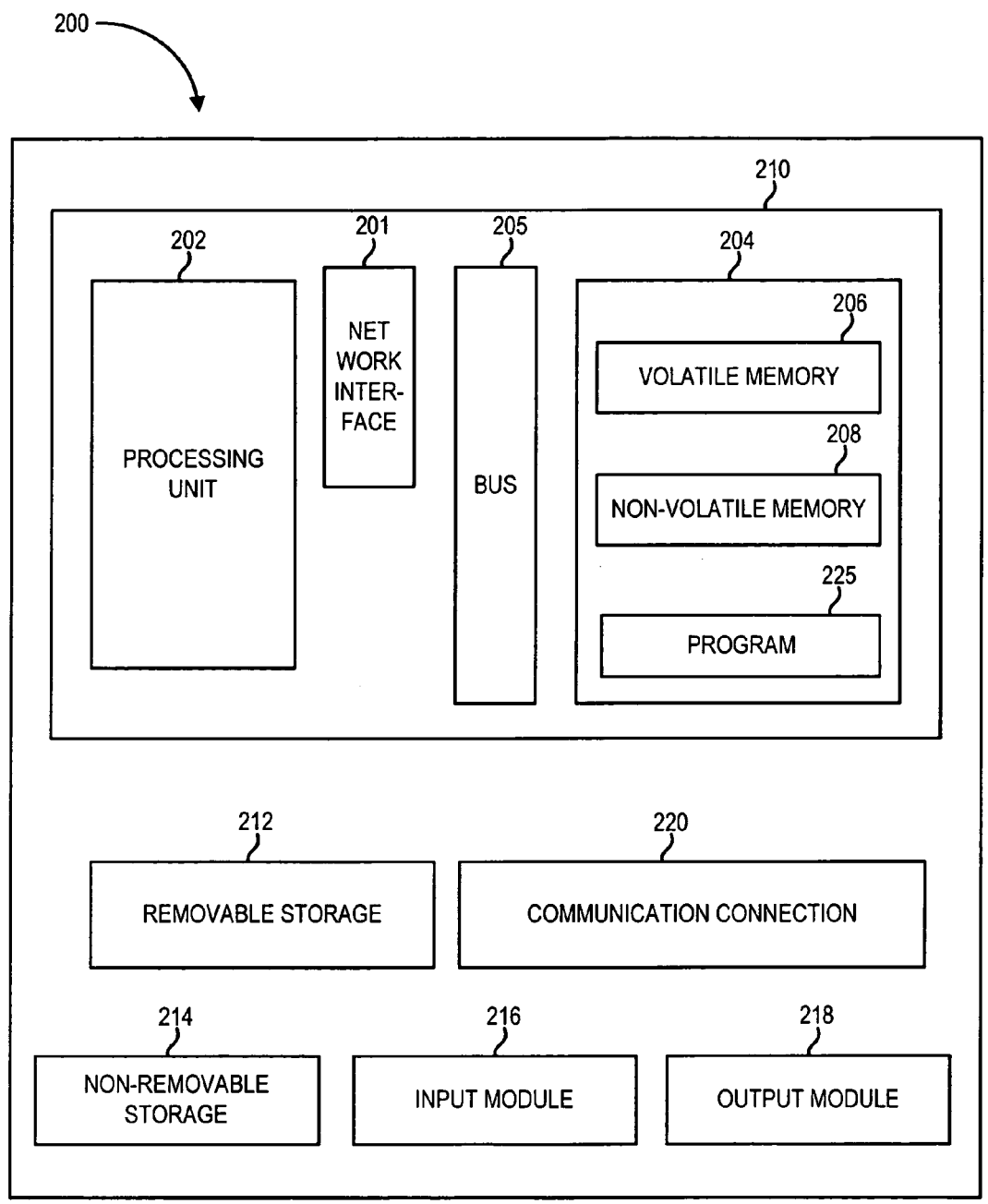
FIG. 2 illustrates a general purpose computing platform which can be used in the implementation of the invention.

Various embodiments of the present subject matter can be implemented in software, which may be run in the environment shown in FIG. 2 or in any other suitable computing environment. The embodiments of the present subject matter are operable in a number of general-purpose or special-purpose computing environments. Some computing environments include personal computers, general-purpose computers, server computers, hand-held devices {including, but not limited to, telephones and personal digital assistants (PDAs of all types)}, laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 2 shows an example of a suitable computing system environment for implementing embodiments of the present subject matter. FIG. 2 and the following discussion are intended to provide a brief, general description of a suitable computing environment in which certain embodiments of the inventive concepts contained herein may be implemented.

A general computing device in the form of a computer 210 may include a processing unit 202, memory 204, removable storage 212, and non-removable storage 214. Computer 210 additionally includes a bus 205 and a network interface (NI) 201. Computer 210 may include or have access to a computing environment that includes one or more user input devices 216, one or more output modules or devices 218, and one or more communication connections 220 such as a network interface card or a USB connection. The one or more user input devices 216 can be a touch screen and a stylus and the like. The one or more output devices 218 can be a display device of computer, computer monitor, TV screen, plasma display, LCD display, display on a touch screen, display on an electronic tablet, and the like. The computer 210 may operate in a networked environment using the communication connection 220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 204 may include volatile memory 206 and non-volatile memory 208. A variety of computer-readable media may be stored in and accessed from the memory elements of computer 210, such as volatile memory 206 and non-volatile memory 208, removable storage 212 and non-removable storage 214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 202 of the computer 210. For example, a computer program 225 may include machine-readable instructions capable of handling a packet based input signal, to perform computations in using the ISI loop and an inside ICI loop, according to the teachings of the described embodiments of the present subject matter. In one embodiment, the computer program 225 may be included on a CD-ROM and loaded from the CD-ROM to a hard drive in non-volatile memory 208. The machine-readable instructions cause the computer 210 to decode according to the various embodiments of the present subject matter.

The foregoing is the description of exemplary implementations of the method and apparatus for an improved DFE design with erasures, minimum error propagation and increased interference removal, using an ICI removal loop embedded inside an ISI removal loop. The above-described implementation is intended to be applicable, without limitation, to situations where a DFE design needs to be addressed, as for example in 802.11 b/g PHY scenarios. The description hereinabove is intended to be illustrative, and not restrictive.

The design approach for DFE described herein is applicable generally to any communication system requiring a DFE, and the embodiments described herein are in no way intended to limit the applicability of the invention. In addition, the techniques of the various exemplary embodiments are useful to the design of any hardware implementations of software, firmware, and algorithms in the context of decoding in general. Many other embodiments will be apparent to those skilled in the art. The scope of this invention should therefore be determined by the appended claims as supported by the text, along with the full scope of equivalents to which such claims are entitled.

The invention claimed is:

1. A method of designing a decision feedback equalizer (DFE) for handling packet based complementary code keyed (CCK) symbols comprising chips, the method comprising the steps:

providing an inter symbol interference (ISI) loop for addressing removal of ISI caused between said CCK symbols, using symbol decisions;

providing an inter chip interference (ICI) loop for addressing removal of ICI caused between said chips of said CCK symbols in said ICI loop, using chip decisions; and, placing said ICI loop to be nested within said ISI loop such that said packet based CCK symbols first enter the ISI loop.

2. The method as in claim 1, including the step of implementing post-cursor interference removal using a feedback loop.

3. The method as in claim 1, including the step of removing selected ones of said decisions that are prone to errors according to a threshold, by erasure.

4. The method as in claim 3, including the step of scaling non-erased decisions by a weighting function, based on error probability.

5. The method as in claim 4, wherein said weighting function and erasure threshold are controlled based on a technique using Euclidean distance.

6. The method as in claim 4, wherein said weighting function and erasure threshold are controlled based on a minimum distance of in-phase (I) and quadrature (Q) paths.

7. The method as in claim 4, wherein said weighting function and erasure threshold are controlled based on an average distance from an ideal constellation of in-phase and quadrature paths.

8. The method as in claim 2, including the step of using a CCK modulator in the ISI loop.

9. The method as in claim 4, including keeping said weighting function at a constant level.

10. The method as in claim 4, including the step of computing said erasure threshold and weighting function based on said CCK symbols.

11. The method as in claim 1, including the step of analyzing a decision error probability in said ICI loop.

12. The method as in claim 1, including the step of measuring an error probability and using the measured error probability to optimize performance of said ISI and said ICI loops.

13. The method as in claim 12, including the step of using a feed forward filter for receiving said packet based CCK symbols.

14. The method as in claim 13, including the step of using an input buffer disposed in series with said feed forward filter, an output from said input buffer being connected to an input of said ISI loop.

15. A decision feedback equalizer (DFE) for use in a wireless local area network (WLAN) implementation, where packet based complementary code keying (CCK) symbols comprising chips are used, said DFE comprising:

an inter chip interference (ICI) loop for removal of interference caused between chips of said CCK symbols in said ICI loop, using chip decisions; and, an inter symbol interference (ISI) loop for addressing interference caused between said CCK symbols, using symbol decisions;

said ICI loop being disposed within said ISI loop such that said packet based CCK symbols first enter the ISI loop.

16. The DFE as in claim 15, wherein said ISI loop comprises a CCK modulator connected in series with a feedback filter.

17. The DFE as in claim 15, including a CCK demodulator providing an output from the DFE, said CCK demodulator comprising a Fast Walsh Transform (FWT) unit connected in series with a maxima picker.

18. The DFE as in claim 15, wherein said ICI loop includes a chip decision unit and a series connected weighted feedback filter.

19. The DFE as in claim 15, including: a feed forward filter connected for receiving said packet based CCK symbols, an input buffer disposed in series with said feed forward filter, an output from said input buffer being connected to an input of said ISI loop, wherein said ISI loop includes a CCK modulator and a series connected feedback filter.

20. An article comprising a storage medium having instructions thereon which when executed by a computing platform result in execution of a method of designing a decision feedback equalizer (DFE) for handling packet based complementary code keyed (CCK) symbols comprising chips, the method comprising the steps of:

providing an inter chip interference (ICI) loop for addressing interference between said chips of said CCK symbols in said ICI loop, using chip decisions;

providing an inter symbol interference (ISI) loop for addressing interference between said CCK symbols, using symbol decisions; and, placing said ICI loop to be nested within said ISI loop such that said packet based CCK symbols first enter the ISI loop.

21. The article as in claim 20, including the step of implementing post-cursor interference removal using a feedback loop.

22. The article as in claim 20, wherein the method includes the step of removing selected ones of said decisions that are prone to errors according to a threshold, by erasure.

23. The article as in claim 22, wherein the method includes the step of scaling non-erased decisions by a weighting function, based on error probability.

24. The article as in claim 23, wherein the method includes the step of computing said erasure threshold and weighting function based on said CCK symbols.

* * * * *

UNITED STATES PATENT AND TRADEMARK OFFICE
CERTIFICATE OF CORRECTION

PATENT NO. : 7,457,357 B2  Page 1 of 1
APPLICATION NO. : 11/121455
DATED : November 25, 2008
INVENTOR(S) : Rahul Garg, Shobha Ramaswamy and Aparna Chakrakodi Krishnashastry It is certified that error appears in the above-identified patent and that said Letters Patent is hereby corrected as shown below:

Title page, item [75]

The third inventor's name should read:

Aparna Chakrakodi Krishnashastry

Signed and Sealed this

Twenty-fourth Day of March, 2009

JOHN DOLL
*Acting Director of the United States Patent and Trademark Office*